United States Patent [19]
Kakizaki et al.

[11] Patent Number: 5,438,514
[45] Date of Patent: Aug. 1, 1995

[54] APPARATUS FOR CONTROLLING DAMPING COEFFICIENT FOR VEHICULAR SHOCK ABSORBER

[75] Inventors: Shinobu Kakizaki; Makoto Kimura, both of Kanagawa, Japan

[73] Assignee: Atsugi Unisia Corporation, Japan

[21] Appl. No.: 993,038

[22] Filed: Dec. 18, 1992

[30] Foreign Application Priority Data

Dec. 27, 1991 [JP] Japan .................................. 3-345697
Dec. 27, 1991 [JP] Japan .................................. 3-345699

[51] Int. Cl.$^6$ .......................................... B60G 17/015
[52] U.S. Cl. ............................................. 364/424.05
[58] Field of Search ................... 364/424.05; 280/707, 280/840

[56] References Cited

U.S. PATENT DOCUMENTS

| | | | |
|---|---|---|---|
| 4,659,104 | 4/1987 | Tanaka et al. | 280/707 |
| 4,886,291 | 12/1989 | Okamoto | 280/707 |
| 4,939,654 | 7/1990 | Kouda et al. | 364/424.05 |
| 4,973,079 | 11/1990 | Tsukamoto | 280/707 |
| 4,973,855 | 11/1990 | Kamimura et al. | 280/707 |
| 5,013,061 | 5/1991 | Fujimura et al. | 280/707 |
| 5,041,977 | 8/1991 | Kawabata | 280/707 |
| 5,042,833 | 8/1991 | Kawabata | 280/707 |
| 5,092,625 | 3/1992 | Kawabata | 364/424.05 |

FOREIGN PATENT DOCUMENTS

| | | |
|---|---|---|
| 0401802 | 12/1990 | European Pat. Off. . |
| 3545054 | 7/1986 | Germany . |
| 3437799 | 4/1996 | Germany . |
| 62-181908 | 8/1987 | Japan . |

*Primary Examiner*—Gary Chin
*Attorney, Agent, or Firm*—Ronald P. Kananen

[57] ABSTRACT

In an apparatus for controlling a variable damping coefficient for at least one vehicular shock absorber, the shock absorber being interposed between a vehicle body and a tire wheel, an adjuster of the shock absorber which is so constructed as to change its position so as to provide an optimum damping coefficient for the shock absorber in response to a drive by means of an actuator (pulse motor), vehicle behavior detector which is so constructed as to detect a vehicle behavior, a damping coefficient control portion to derive an optimum damping coefficient according to the vehicular behavior, and a drive/control portion to form a drive/control signal to actuate the actuator, the drive/control portion is separated from the damping coefficient control portion and is integrally incorporated into the actuator. Furthermore, a fail safe circuit is integrally incorporated into the actuator, which is so constructed as to provide a predetermined fail safe drive for the actuator upon receipt of a signal indicating an occurrence of abnormality in either the damping coefficient control portion or drive/control portion from the damping coefficient control side.

11 Claims, 9 Drawing Sheets

| ROTATION DIRECTION | AH | AL | BH | BL | CH | CL | U | V | W |
|---|---|---|---|---|---|---|---|---|---|
| Ccw1 | 0 | 1 | 0 | 1 | 1 | 0 | 0 | 0 | 1 |
| 2 | 0 | 0 | 0 | 1 | 1 | 0 | - | 0 | 1 |
| 3 | 1 | 0 | 0 | 1 | 1 | 0 | 1 | 0 | 1 |
| 4 | 1 | 0 | 0 | 1 | 0 | 0 | 1 | 0 | - |
| 5 | 1 | 0 | 0 | 1 | 0 | 1 | 1 | 0 | 0 |
| 6 | 1 | 0 | 0 | 0 | 0 | 1 | 1 | - | 0 |
| 7 | 1 | 0 | 1 | 0 | 0 | 1 | 1 | 1 | 0 |
| 8 | 0 | 0 | 1 | 0 | 0 | 1 | - | 1 | 0 |
| 9 | 0 | 1 | 1 | 0 | 0 | 1 | 0 | 1 | 0 |
| 10 | 0 | 1 | 1 | 0 | 0 | 0 | 0 | 1 | - |
| 11 | 0 | 1 | 1 | 0 | 1 | 0 | 0 | 1 | 1 |
| Cw12 | 0 | 1 | 0 | 0 | 1 | 0 | 0 | 1 | - |

APPARATUS FOR CONTROLLING DAMPING COEFFICIENT FOR VEHICULAR SHOCK ABSORBER

BACKGROUND OF THE INVENTION

1. Field of the Invention

The present invention relates generally to an apparatus for controlling a damping coefficient of a shock absorber (also called a damper, but hereinafter referred to as the shock absorber) interposed between an unsprung mass and sprung mass of the vehicle so as to provide an optimum damping force therefrom. The shock absorber is provided with changing means for changing the damping coefficient thereof at multiple stages in response to a drive signal.

2. Description of the Background Art

A Japanese Patent Application First Publication No. Showa 62-181908 published on Aug. 10, 1987 exemplifies a previously proposed apparatus for controlling a damping coefficient of a vehicular shock absorber.

The previously proposed damping coefficient controlling apparatus recited in the above-identified Japanese Patent Application First Publication includes: acceleration detecting means for detecting a longitudinal acceleration in upward-downward directions of a vehicle body; and command output means for generating and outputting a command to change a damping force to a larger value at a predetermined period of time during which the detected longitudinal acceleration exceeds a predetermined value and the vehicle body returns to a neutral position with respect to the corresponding tire wheel to a damping coefficient changing means installed in the shock absorber. Thus, when a large vibrating force is generated on the vehicle body, the vehicle body can speedily return to its neutral position with respect to the vehicle tire wheel within a half period of the vibration.

Since, however, the previously proposed damping coefficient controlling apparatus has no countermeasure against a failure in its control unit, an abnormal control signal is output from the control unit to an actuator of the damping coefficient changing means and the vehicle exhibits an unnatural behavior if an external noise causes a CPU of the control unit to operate abnormally. Consequently, steering stability of the vehicle and vehicular comfort can be reduced.

In addition, since, in the previously proposed damping coefficient controlling apparatus, a portion for calculating an optimum damping force on the basis for received signals from respective sensors and a portion of generating the control signal to drive the actuator on the basis of the calculation result of the above-described portion are integrated into the control unit, the control signal to drive the actuator cannot be transmitted to the actuator if such a failure as breakage of a wire connected between the control unit and actuator occurs. Even if the control unit detects the abnormality and the actuator is driven at a safe position, the control unit cannot drive the actuator.

SUMMARY OF THE INVENTION

It is, therefore, a principal object of the present invention to provide an improved apparatus for controlling a damping coefficient of a shock absorber which can place the drive actuator in a safe mode when an abnormality in the apparatus occurs.

The above-described object can be achieved by providing an apparatus for controlling a variable damping coefficient for at least one vehicular shock absorber, the shock absorber being interposed between a vehicle body and a tire wheel, comprising: a) an actuator; b) damping coefficient changing means for operatively changing its position so as to provide an optimum damping coefficient for the shock absorber in response to a drive signal derived from said actuator; c) input signal generating means for generating an input signal related to a vehicular behavior; d) a damping coefficient control portion which is so constructed as to derive the optimum damping coefficient for the shock absorber according to the vehicular behavior upon receipt of the input signal from the input signal generating means; e) a drive/control portion which is so constructed as to form a drive/control signal to actuate the actuator to output the drive signal to the damping coefficient changing means, the drive/control portion being integrally incorporated into the actuator and being separated from the damping coefficient control portion; and f) a fail safe control portion, installed in the actuator, which is so constructed as to provide a predetermined fail safe drive for the actuator upon receipt of a signal indicating an occurrence of abnormality in either the damping coefficient control portion or drive/control portion from the damping coefficient control portion.

The above-described object can also be achieved by providing an apparatus for controlling variable damping coefficients for vehicular shock absorbers, each shock absorber being interposed between a vehicle body and a tire wheel, comprising: a) actuators; b) damping coefficient changing means for operatively changing its position so as to provide optimum damping coefficients for the respective shock absorbers in response to drive signals derived from said respective actuators; c) input signal generating means for generating input signals related to a vehicular behavior; d) a damping coefficient control portion which is so constructed as to derive the optimum damping coefficients for the respective shock absorbers according to the vehicular behavior upon receipt of the input signals from the input signal generating means; e) a drive/control portion which is so constructed as to form drive/control signals to actuate the actuators to output the drive signals to the damping coefficient changing means, the drive/control portion being integrally incorporated into the respective actuators and being separated from the damping coefficient control portion; and f) a fail safe control portion, installed in each of the actuators, which is so constructed as to provide a predetermined fail safe drive for each of the actuators upon receipt of a signal indicating an occurrence of abnormality in either the damping coefficient control portion or the drive/control portion from the damping coefficient control portion.

BRIEF DESCRIPTION OF THE DRAWINGS

FIGS. 6 (A) through 6 (C) are cross sectional views cut away along line K—K of FIG. 3, line M—M of FIG. 3, and line N—N of FIG. 3, respectively, when the damping position indicates ②.

FIGS. 7 (A) through 7 (C) are cross sectional views cut away along line K—K of FIG. 3, M—M of FIG. 3, and line N—N of FIG. 3, respectively, when the damping position indicates ①.

FIGS. 8 (A) through 8 (C) are cross sectional views cut away along line K—K of FIG. 3, M—M of FIG. 3, and line N—N of FIG. 3, respectively when the damping position indicates ③.

DESCRIPTION OF THE PREFERRED EMBODIMENT

Reference will, hereinafter, be made to the drawings in order to facilitate a better understanding of the present invention.

Figure 1:
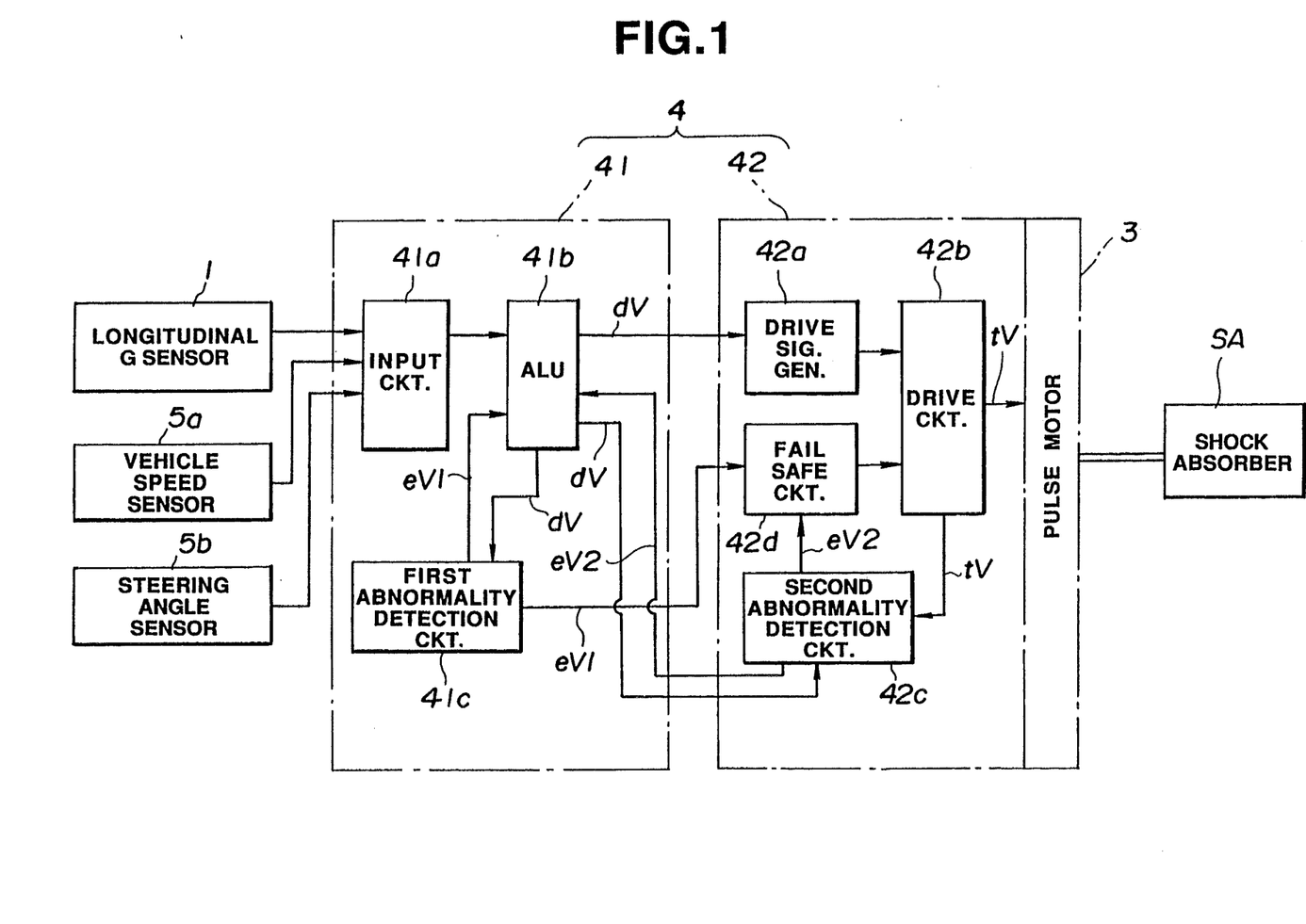
FIG. 1 is a circuit block diagram of a shock absorber damping coefficient controlling apparatus in a preferred embodiment according to the present invention.

FIG. 1 shows a whole circuit block diagram of a damping coefficient controlling apparatus in a preferred embodiment according to the present invention.

In FIG. 1, four shock absorbers SA of damping force variable types are disposed respectively between a sprung mass (vehicle body) and an unsprung mass (tire wheel). Each shock absorber SA is so constructed as to change its damping coefficient in response to the drive to the pulse motor (actuator) 3, as will be described later.

Longitudinal G (acceleration) sensors 1 used to detect longitudinal accelerations (to detect a vehicular body behavior) are mounted on parts of the vehicle body placed adjacent mounting positions of the respective shock absorbers SA onto the vehicle body.

In addition, a vehicle speed sensor 5a and steering angle sensor 5b are connected to a control unit 4.

The control unit 4 is constituted by a main control unit 41 and sub control unit 42.

The main control unit 41 is constituted by a so-called microcomputer installed adjacent a driver's seat of the vehicle body (not shown).

As shown in FIG. 1, an input circuit 41a which receives signals derived from the sensors 1, 5a, and 5b, a calculation circuit (damping coefficient control portion) 41b which calculates an optimum damping coefficient of the shock absorber SA on the basis of a vehicular body behavior derived from the input circuit 41a and outputs the coefficient control signal dv indicating the damping coefficient; and a first abnormality detection circuit 41c which determines a presence or absence of an abnormality in the calculation circuit 41b on the basis of a coefficient control signal dv output from the calculation circuit 41b and outputs an abnormality occurrence signal ev1 when the abnormality is detected. The detection of the abnormality will be described later.

Representatively one pulse motor 3 is interposed between a control unit 4, i.e., the sub control unit 42 and a corresponding one of the shock absorbers SA.

The sub control unit 42 is integrally incorporated into the pulse motor 3.

As shown in FIG. 1, the sub control unit 42 includes: a drive signal calculation circuit (drive control portion) 42a which calculates a drive/control signal tv on the basis of the coefficient control signal dv from the calculation circuit 41b; a drive circuit 42b which generates and outputs the drive/control signal tv to drive the pulse motor 3 on the basis of the calculation result of the drive signal calculation circuit 42a; a second abnormality detection circuit 42c which determines a presence or absence of an abnormality in the drive signal calculation circuit 42a and drive circuit 42b on the basis of the drive/control signal tv output from the drive circuit 42b; and a fail safe circuit 42d which, upon receipt of either of the abnormality occurrence signals ev1 or ev2 from the respective abnormality detection circuits 41c and 42c, provides a predetermined fail safe drive for the pulse motor 3.

Figure 2:
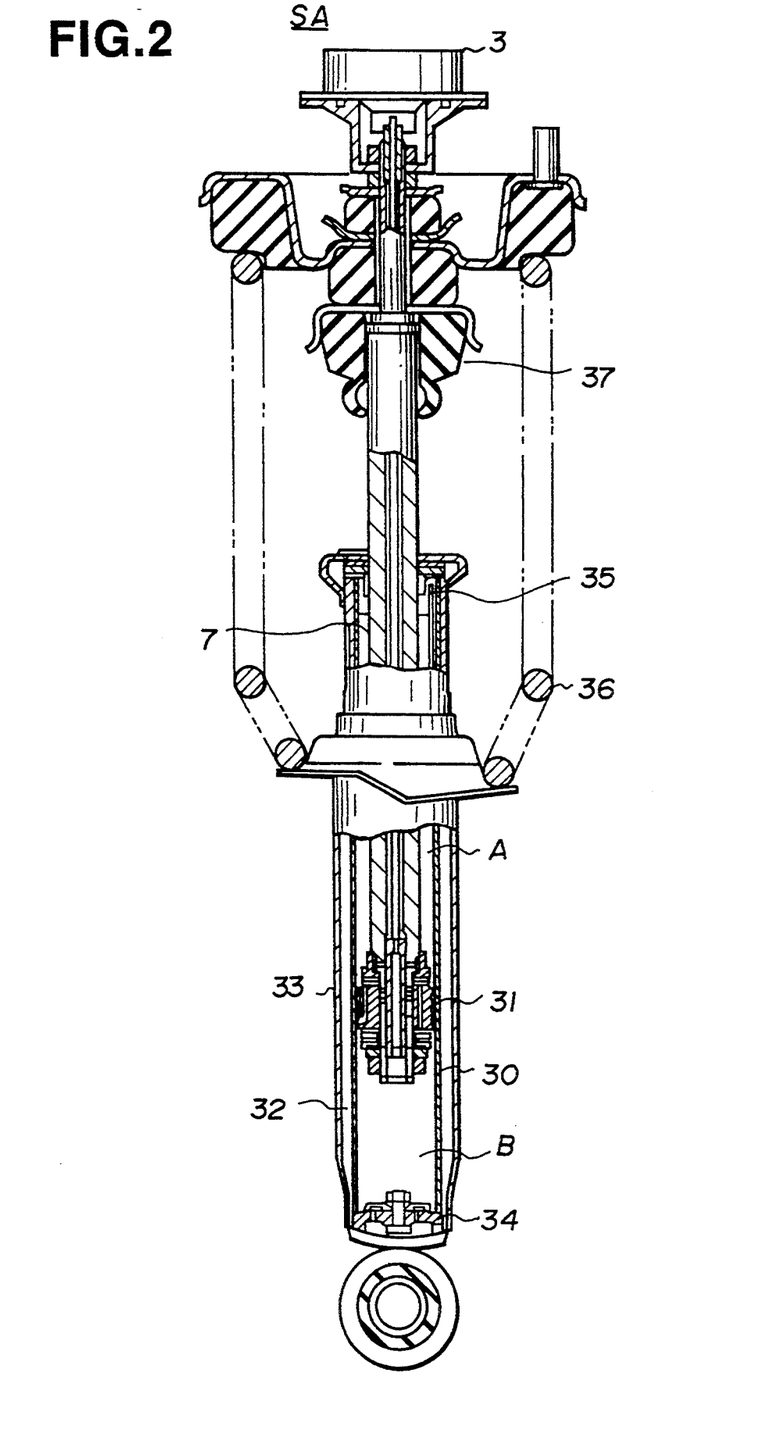
FIG. 2 is a cross sectional view of a shock absorber used in the preferred embodiment shown in FIG. 1.

Next, FIG. 2 shows a cross sectional view of each shock absorber SA.

Each shock absorber SA, as shown in FIG. 2, includes: a cylinder 30, a piston 31 disposed in the cylinder 30 so as define the cylinder 30 into an upper chamber A and lower chamber B, an outer envelope 33 to form a reservoir C on an outer periphery of the cylinder 30, a base 34 defining the lower chamber B and reservoir C; a guide member 35 slidably guiding the piston rod 7 which is associated with the piston 31; a suspension spring 36 intervened between the outer envelope 33 and vehicle body; and the a bumper rubber member (or bushing) 37.

Figure 3:
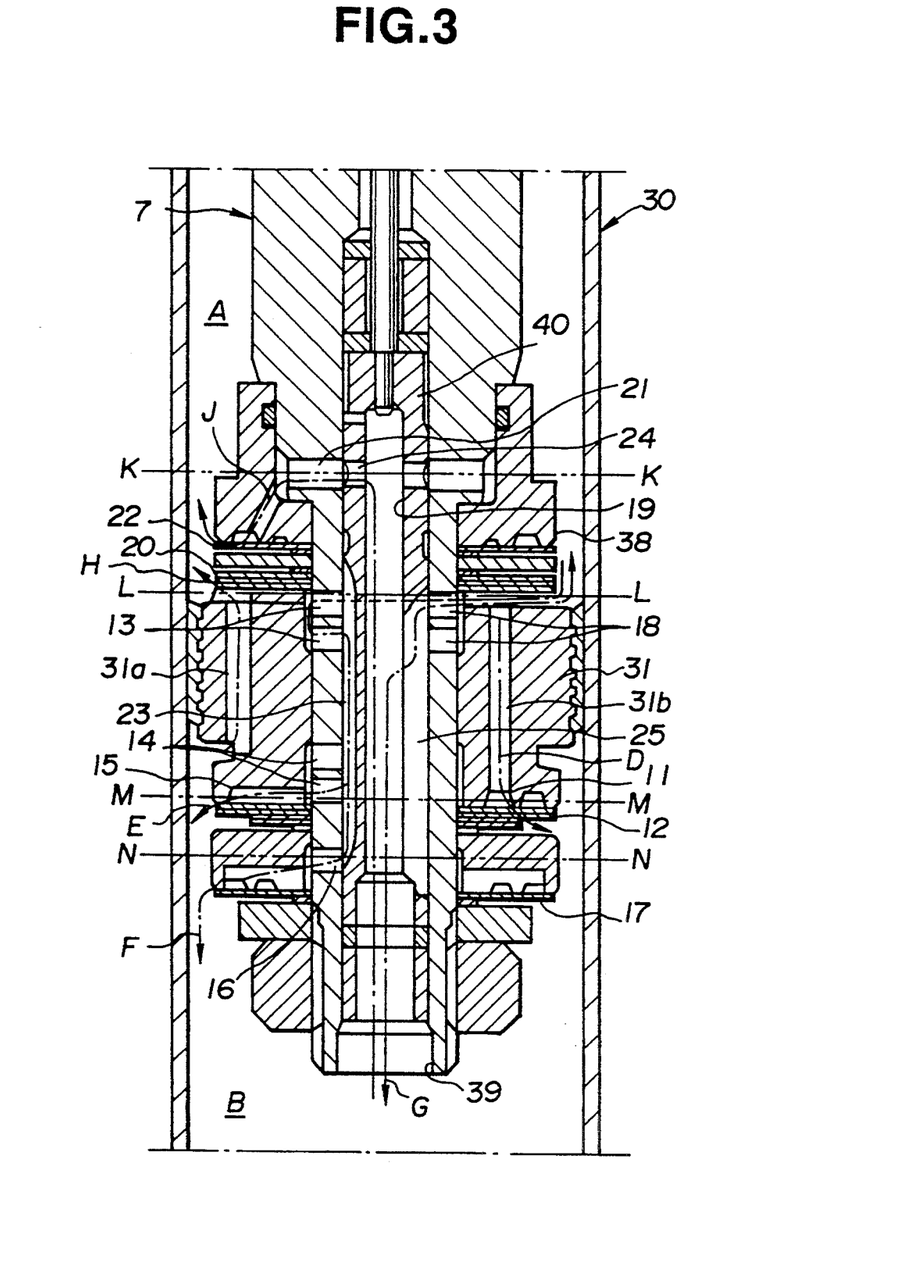
FIG. 3 is an enlarged cross sectional view of a piston member and its surrounding members of the shock absorber used in the preferred embodiment shown in FIGS. 1 and 2.

Next, FIG. 3 shows an enlarged cross sectional view of the piston 31 and its surrounding members.

As shown in FIG. 3, the piston 31 is formed with penetrating holes 31a and 31b. An expansion stroke side damping valve 12 and a compression stroke side damping valve 20 are installed respectively to open and close each penetrating hole 31a and 31b. A communicating hole 39 is formed on a tip of the piston rod 7 so as to be penetrated through the piston 31. The penetrating hole 39 communicates the upper chamber A and lower chamber B. An adjuster 40 operatively changes a flow passage cross sectional area of the penetrating hole 39.

Expansion stroke side and compression stroke side check valves 17 and 22 are installed which enable or interrupt the flow communications of the communication hole 39 according to a direction of fluid flow.

As will be described later, the adjuster 40 is pivoted by means of the pulse motor 3. First port 21, second port 13, third port 18, and fifth port 16 are formed on the tip of the piston rod 7. A retainer 38 is installed on which the compression stroke side check valve 22 is seated.

On the other hand, the adjuster 40 is formed with a hollow portion 19, a first lateral hole 24 and a second lateral hole 25. Furthermore, a longitudinal groove 23 is formed on its outer peripheral portion.

Each shock absorber SA has four flow passages through which a working fluid is communicable between the upper chamber A and lower chamber B at the piston's expansion stroke include: 1) an extension (expansion) side first flow passage D from the penetrating hole 31b, passing through an open state of an inside of the expansion stroke side damping valve 12, and reaching the lower chamber B; 2) an extension (or expansion) side second flow passage E passing through the second port 13, longitudinal groove 23, and fourth port 14, from an outer peripheral side of an opened valve of the expansion stroke side damping valve 12 to the lower chamber B; 3) an extension (or expansion) stroke side third flow passage F passing through the second port 13, longitudinal groove 23, and fifth port 16 to the lower chamber B and via the opened extension (expansion) side check valve 17; and 4) a bypass flow passage G passing through the third port 18, a second lateral hole 25 and the hollow portion 19.

In addition, the flow passages of the working fluid within the lower chamber B compressed during the compression stroke which is communicable with the upper chamber A are divided into three flow passages: 1) a compression side first flow passage H from the opened state of the compression side damping valve 20; 2) a compression side second flow passage J from the hollow portion 19, first lateral hole 24, first port 21, and opened valve of the compression stroke side check valve 22 into the upper chamber A; and the bypass flow passage G via the hollow portion 19, second lateral hole 25, and third port 18 and into the upper chamber A.

Figure 4:
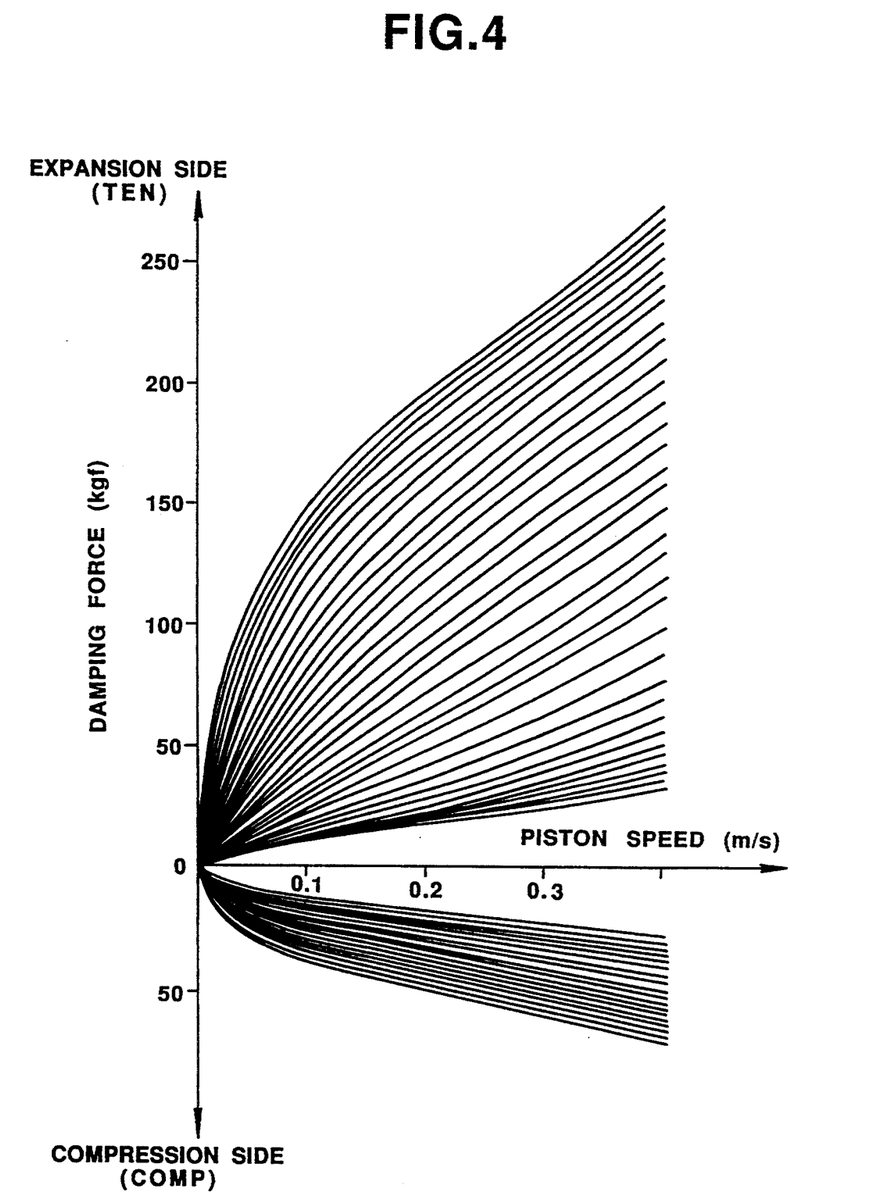
FIG. 4 is a characteristic graph representing variation in a damping force with respect to a speed of a piston in the shock absorber used in the preferred embodiment shown in FIGS. 1 through 3.

In details, each shock absorber SA is so constructed as to change its damping coefficient in multiple stages either at the expansion stroke side or compression stroke side with a characteristic shown in FIG. 4 when the adjuster 40 is pivoted.

In more detail, when the adjuster 40 is pivoted in a counterclockwise direction from a state in which the damping coefficient at both of the expansion and compression stroke sides is in a soft damping region (hereinafter, referred to as a soft region SS), the damping coefficient only at the expansion stroke side is changeable at the multiple stages and that at the compression stroke side is fixed (hereinafter referred to as an expansion stroke side hard region HS). Conversely, when the adjuster 40 is pivoted in the clockwise direction from the above-described state, the damping coefficient only at the compression stroke side is changeable at the multiple stages and that at the expansion stroke side is fixed (hereinafter, referred to as the compression stroke side hard region SH).

Figure 5:
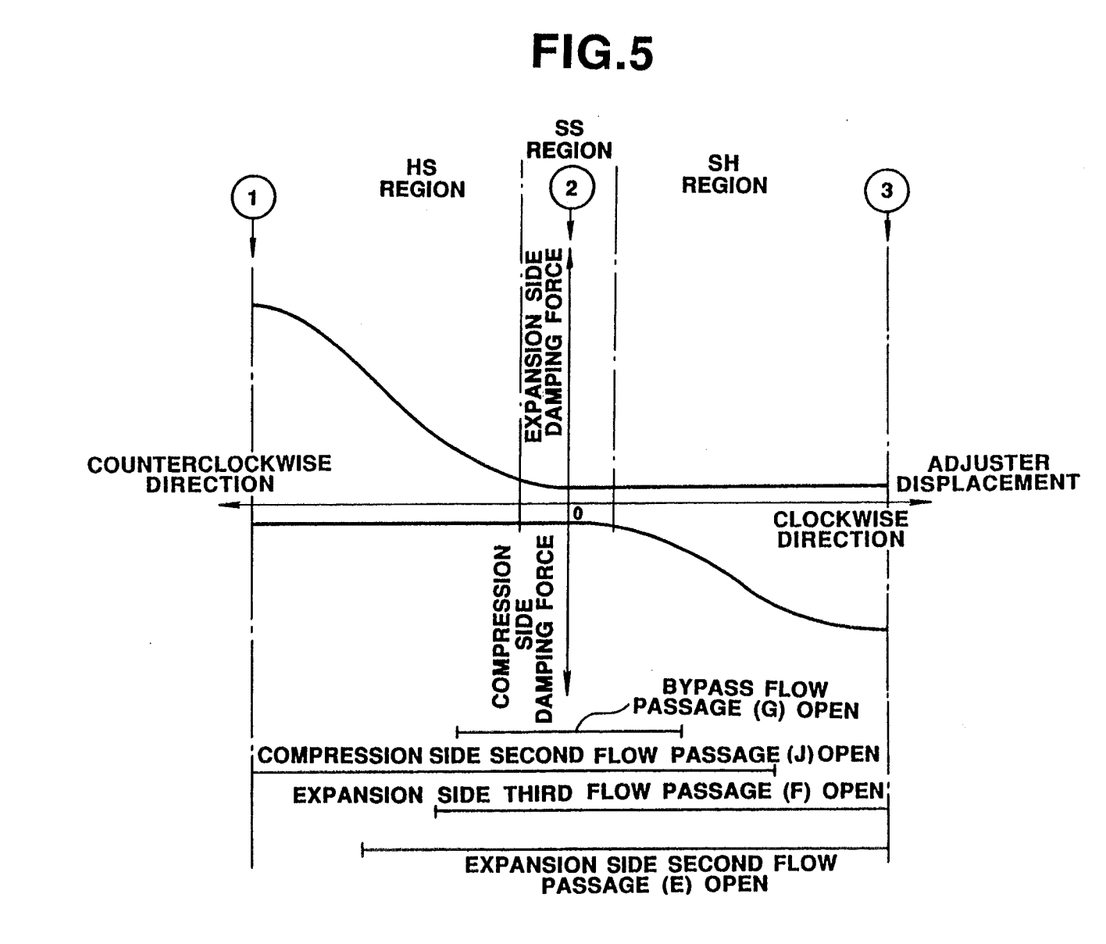
FIG. 5 is a characteristic graph representing variation in the damping coefficient with respect to a stepping angle of an adjuster of the shock absorber used in the preferred embodiment shown in FIGS. 1 through 4.
Figure 6A:
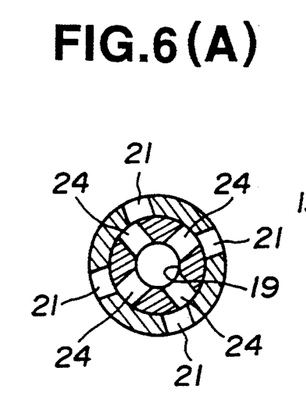
Figure 6B:
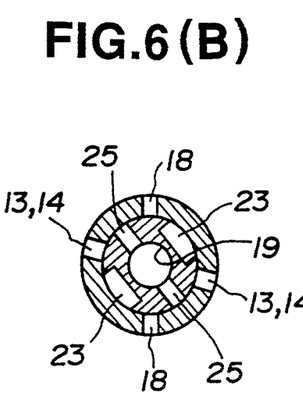
Figure 6C:
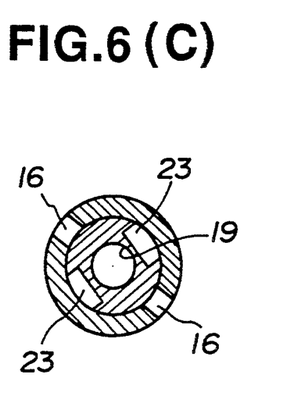
Figure 7A:
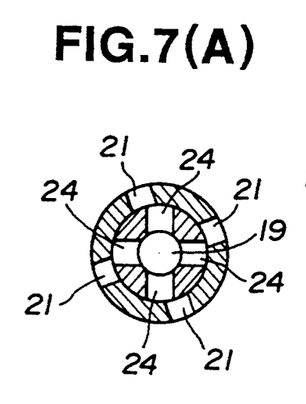
Figure 7B:
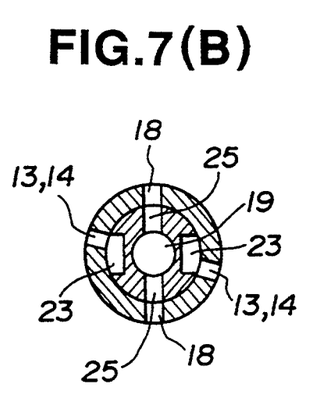
Figure 7C:
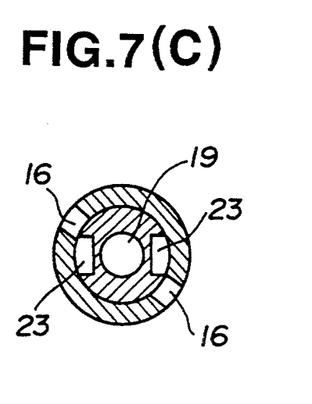
Figure 8A:
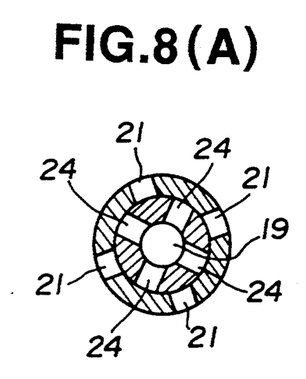
Figure 8B:
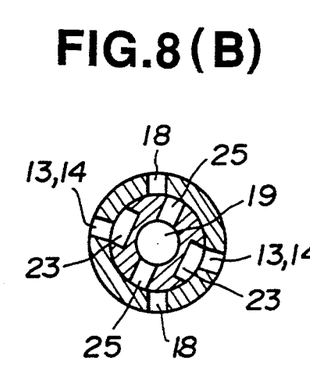
Figure 8C:
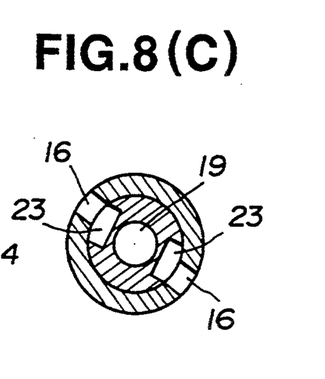
Figure 9:
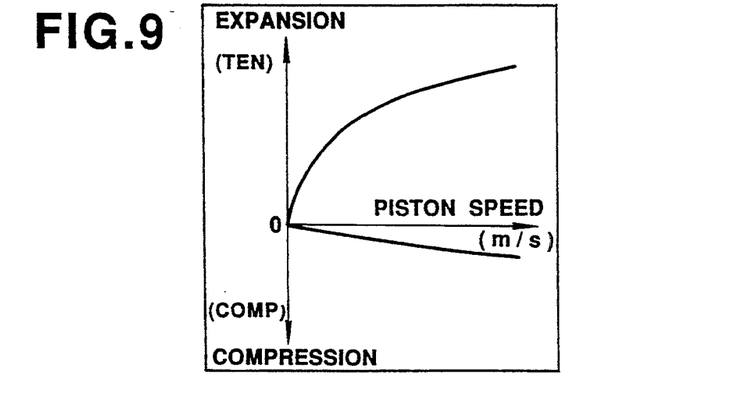
FIG. 9 is a characteristic graph representing damping force with respect to the piston speed when the shock absorber indicates the first position ① shown in FIG. 5.
Figure 10:
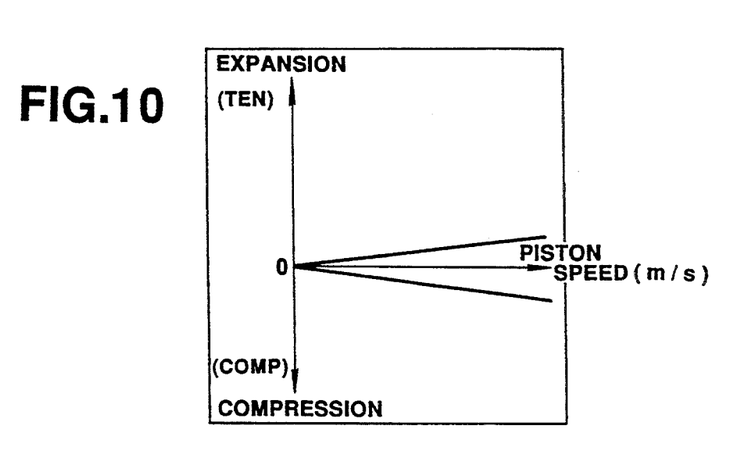
FIG. 10 is a characteristic graph representing the damping force with respect to the piston speed when the shock absorber indicates the second position ② shown in FIG. 5.
Figure 11:
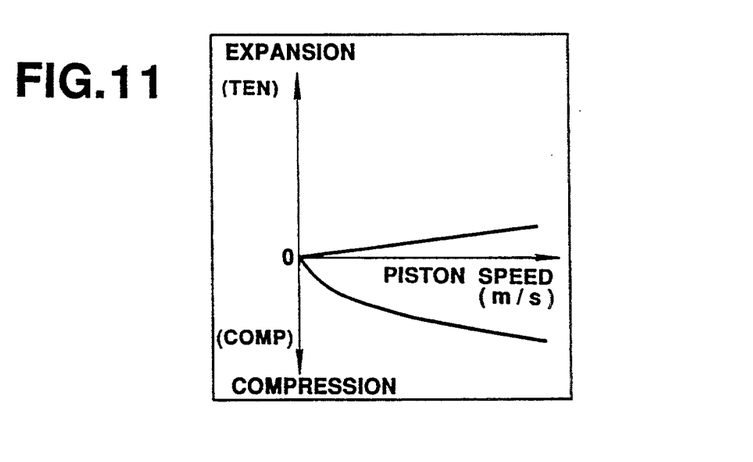
FIG. 11 is a characteristic graph representing a damping force with respect to the piston speed in the preferred embodiment of the damping coefficient controlling apparatus when the shock absorber indicates the third position ③.

When the adjuster 40 is pivoted and placed at any one of positions ③, ②, and ③ of FIG. 5, cross sectional views cut away along lines K—K, M—M, and N—N in FIG. 3 are respectively shown in FIGS. 6 (A) through 8 (C) and their damping characteristics at the respective positions are shown in FIGS. 9 through 11, respectively.

Figure 12:
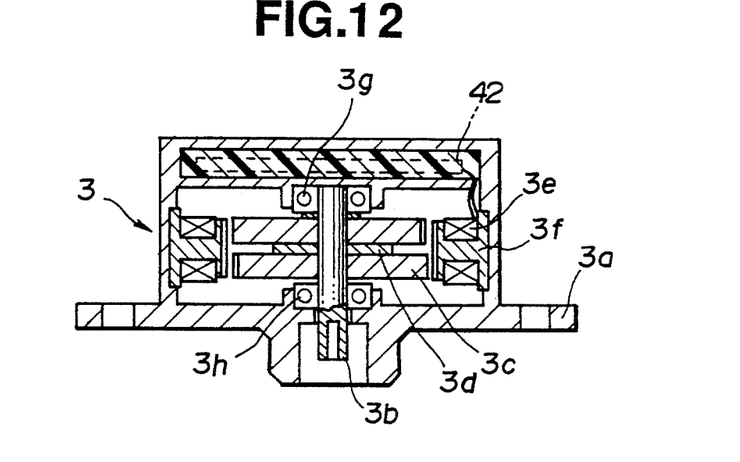
FIG. 12 is a cross sectional view of a pulse motor in the preferred embodiment of the damping coefficient controlling apparatus.

Next, FIG. 12 shows an enlarged cross sectional views indicating a position of the pulse motor 3.

The pulse motor 3 includes a housing 3a; an output axle 3b; a rotor core 3c; a rotor magnet 3d; a stator coil 3e; and stator core 3f. In FIG. 12, numerals 3g and 3h denote journals.

The sub control unit 42 is incorporated on an upper end of the housing 3a.

Next, an abnormal detection of each abnormality detection circuit 41c, 42c will be explained.

Figure 13:
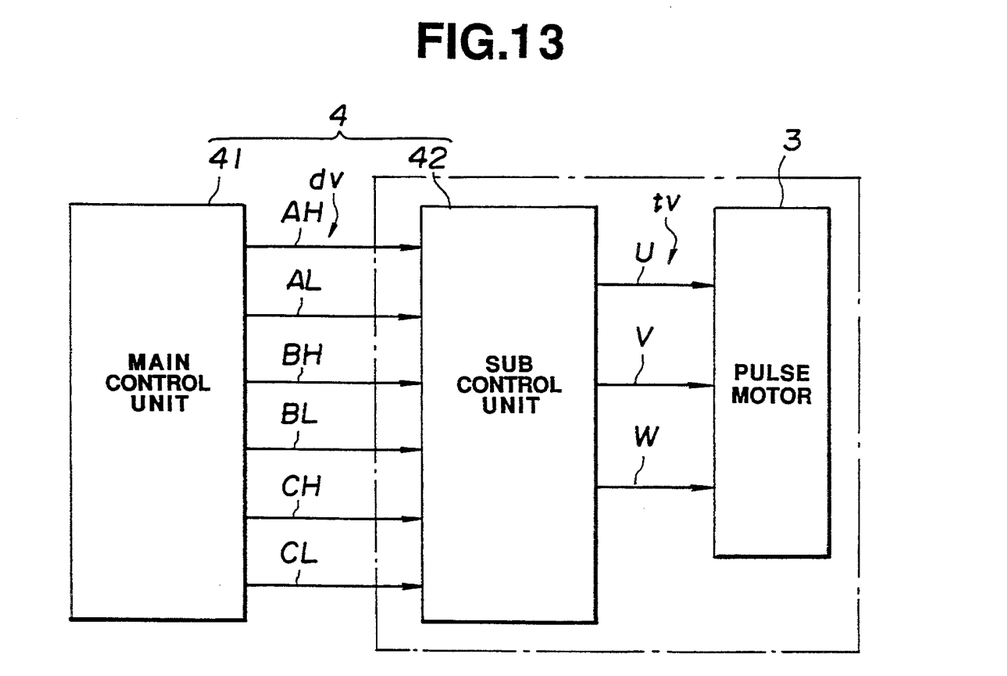
FIG. 13 is a circuit block diagram of a control unit in the preferred embodiment of the damping coefficient controlling apparatus.

FIG. 13 shows a circuit block diagram of an essential portion of the control unit 4.

The coefficient control signal dv transmitted from the main control unit 41 to the sub control unit 42 is constituted by six kinds of 0 and 1 bit patterns (AH, AL, BH, BL, CH, and CL). In addition, the drive/control signal tv transmitted from the sub control unit 42 to the pulse motor 3 is constituted by three kinds of 0 and 1 bit patterns (u, v, w).

Figure 14:
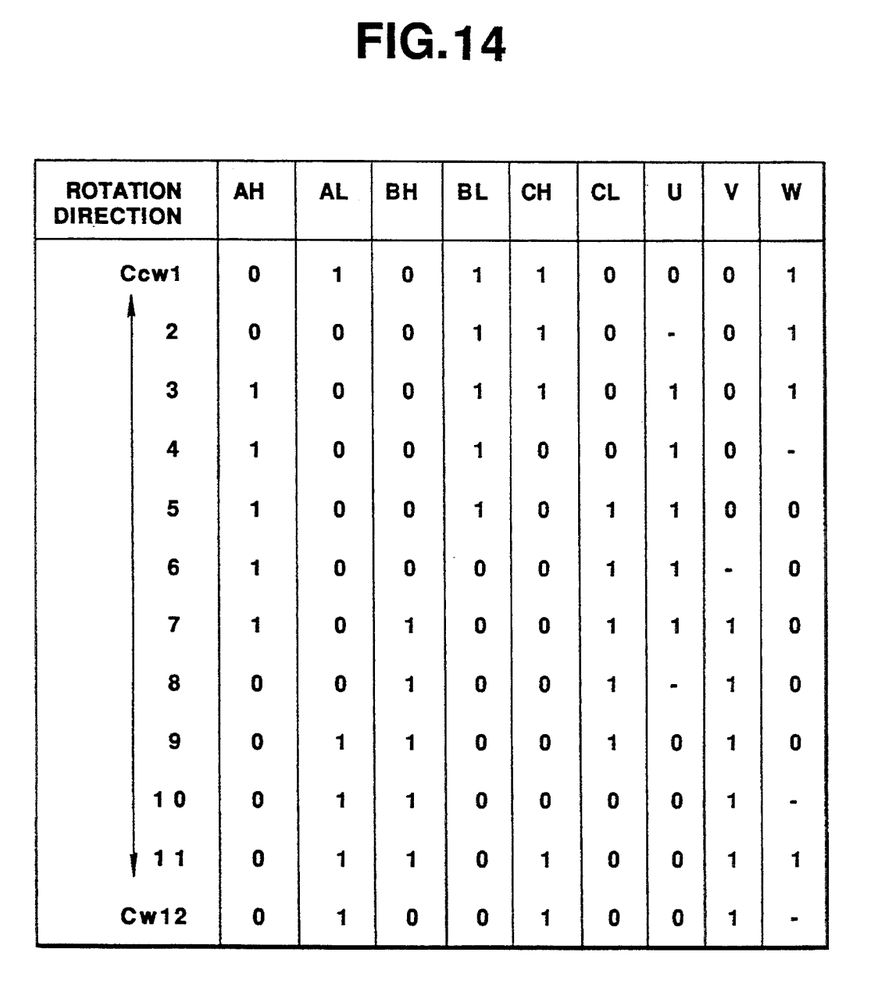
FIG. 14 is a characteristic graph of a coefficient control signal in a damping coefficient control signal in the preferred embodiment and drive control signal to an actuator in the preferred embodiment according to the present invention.

FIG. 14 shows the bit patterns of the coefficient control signal dv and drive/control signal tv.

The bit patterns of the coefficient control signal dv and drive/control signal tv are shown in FIG. 14 on the basis of the drive steps in the pulse motor 3.

Hence, if each control unit 41 and 42 operates normally, the coefficient control signal dv is changed sequentially in the bit 0, 1 pattern shown in FIG. 14 if each control unit 41 and 42 operates normally (for example, if the present pattern is No. 6 in the pivotal direction, next signal pattern is No. 5 or No. 7. The drive/control signal tv is also the same.

The first abnormality detection circuit 41c monitors a change in the coefficient drive signal dv. If the coefficient control signal dv is changed to an impossible bit pattern, the abnormality occurrence signal ev1 is output to the calculation circuit 41b and fail safe circuit 42d.

On the other hand, the second abnormality detection circuit 42c monitors both the coefficient/control signal dv and the drive/control signal tv to determine whether one signal pattern or the other signal pattern corresponds to that shown in FIG. 14. If they do not correspond to each other, the abnormality occurrence signal ev2 is output to the fail safe circuit 42d.

Next, an operation and construction of the fail safe circuit 42d will be described below.

When the abnormality occurrence signal ev1 is input from the first abnormality detection circuit 41c, the drive/control signal tv makes the damping coefficient the above-described expansion stroke side hard region HS to the pulse motor 3. On the other hand, when the abnormality occurrence signal ev2 is input from the second abnormality detection circuit 42c, the operation of the drive circuit 42d is halted and the output of the drive/control signal tv is halted.

Next, the damping coefficient control of the calculation circuit 41b will be described below.

That is to say, the calculation circuit 41b integrates the longitudinal acceleration derived from the longitudinal G sensor 1 to calculate the sprung mass longitudinal speed. Then, the damping coefficient of the shock absorber SA is set in proportion to a direction and speed of the sprung mass longitudinal speed.

That is to say, if the sprung mass longitudinal speed is plus (upward), the damping coefficient is set to the expansion stroke side hard region HS and if the sprung mass longitudinal speed is minus (downward), the damping coefficient is set to the compression stroke side hard region HS. Furthermore, as the sprung mass longitudinal speed becomes higher, the damping coefficient becomes a higher damping coefficient. In the preferred embodiment, as the vehicle speed becomes higher, the damping coefficient becomes higher.

When the vehicle speed exceeds a predetermined vehicle speed and the steering having a variation rate exceeding a predetermined value is carried out on the basis of inputs of the vehicle speed sensor 5a and steering angle sensor 5b, the control unit 4 determines that a rolling motion occurs on a vehicle body, two shock absorbers SA which are placed at the vehicle body downwardly sinking (wherein vehicular height is reducing) provide the damping coefficients at the compression stroke side hard regions SH and the two shock absorbers SA which are placed at the vehicle body upwardly raising (vehicular height is increased) provide the damping coefficients at the expansion stroke side hard regions HS.

Next, an operation of the damping coefficient controlling apparatus in the preferred embodiment will be described below.

A) When the abnormality or failure occurs in the calculation circuit:

When the abnormality occurs in the calculation circuit 41b and the coefficient control signal dv is changed to the impossible bit pattern except shown in FIG. 14, the abnormality occurrence signal ev1 is output to the calculation circuit 41b and fail safe circuit 42d.

Hence, the calculation circuit 41b halts the control and the output is wholly turned OFF, the fail safe circuit 42d controls the drive circuit 42b so that the drive/control signal tv is output from the drive circuit 42b to provide the damping coefficient of the shock absorber SA for a predetermined damping coefficient of the expansion stroke side hard region HS.

B) When the sub control unit 42 is operated abnormally:

When the abnormality occurs in the sub control unit 42 and both of the coefficient control signal dv and drive/control signal tv are not coincident with each other, the second abnormality detection circuit 42c outputs the abnormality occurrence signal ev2 to the fail safe circuit 42d.

Hence, the fail safe circuit 42d halts the operation of the drive circuit 42b to halt the output of the drive/control signal tv toward the pulse motor 3.

As described hereinabove, when the abnormality occurs in the main control unit 41, the shock absorber SA is fixed to the expansion stroke side hard region HS.

In addition, when the abnormality occurs in the sub control unit 42, the control of the damping coefficient for the shock absorber SA is halted so as to perform the fail-safe drive.

Since the vehicle does not behave unnaturally due to abnormal control which does not correspond to the vehicle behavior, an effect such that reductions in the steering stability and vehicular comfort due to the cause in the abnormality occurrence cannot be achieved.

If a breakage occurs in-between the main control unit 41 disposed at a position adjacent the driver's seat and the pulse motor 3 disposed on an upper end of each shock absorber SA, the apparatus can drive the corresponding pulse motor 3 toward a so-called safe side at which the pulse motor 3 forms the damping coefficient characteristic of the expansion stroke side hard region HS.

Although in the preferred embodiment described above, the sprung mass longitudinal speed sensor(s), vehicle speed sensor, and steering angle sensor are listed as the vehicle behavior detecting means, other sensors such as sensor(s) so constructed as to detect a relative speed between the sprung mass longitudinal speed and the unsprung mass, longitudinal speed (weight sensor(s), damping sensor(s), sensor(s) so constructed as to detect lateral acceleration(s) of the vehicle body, and/or sensor(s) so constructed as to detect accelerations in the forward/rearward direction of the vehicle body may alternatively be used.

In addition, to the fail-safe drives discussed in the preferred embodiment, the drives as the actuator drive during the abnormality detection include: a drive such that the shock absorber SA is fixed to the expansion stroke side hard region HS; and a drive such that the damping coefficient control for the Shock absorber SA is halted, other means for placing the damping coefficient at soft regions in both expansion and compression stroke sides, for placing the damping coefficient at hard regions in both expansion and compression stroke sides, or for placing the damping coefficient at medium regions may alternatively be used.

In this case, since the damping coefficient characteristic is different from that in the case of the preferred embodiment, the damping coefficient characteristic is not limited to that in the preferred embodiment.

In the preferred embodiment, the first abnormality detection circuit 41c is disposed in the main control unit 41. However, the drive signal generation circuit 42a and/or second abnormality detection circuit 42c may be installed in the main control unit 41.

As described hereinabove, in the damping coefficient controlling apparatus for the shock absorber(s) according to the present invention, in the control unit, a damping coefficient control portion to derive an optimum damping coefficient through the calculation processing is electrically and mechanically (physically) separated from the drive/control portion to form a signal to drive the actuator and the drive/control portion is integrally incorporated to the actuator, the actuator having a fail safe control portion to drive the actuator toward the fail-safe drive side upon receipt of the abnormality occurrence signal, the actuator can be controlled toward the safe side when either the damping coefficient control portion or the actuator fails although the damping coefficient control portion is separately disposed from the actuator.

Hence, a more safe operation can be achieved and steering stability and vehicular comfort can be improved during the occurrence of the abnormality. This effect can be achieved when the signal transmission between the damping coefficient control portion and actuator cannot be made.

The foregoing description has been made in terms of the preferred embodiment in order to facilitate a better understanding thereof, however, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling a variable damping coefficient for at least one vehicular shock absorber, the shock absorber being interposed between a vehicle body and a tire wheel, comprising:
   a) an actuator;
   b) damping coefficient changing means for operatively changing its position so as to provide an optimum damping coefficient for the shock absorber in response to a drive derived from said actuator;
   c) input signal generating means for generating an input signal related to a vehicular behavior;
   d) a damping coefficient control means which is so constructed as to derive an optimum damping coefficient for the shock absorber according to said vehicular behavior upon receipt of the input signal from the input signal generating means;
   e) a drive/control means which is so constructed as to form a drive/control signal to actuate the actuator to output the drive to the damping coefficient changing means, the drive/control means being integrally incorporated into the actuator and being separated from the damping coefficient control means; and
   f) a fail safe control means, installed in the actuator, which is so constructed as to provide a predetermined fail safe drive for the actuator upon receipt of a signal indicating an occurrence of an abnormality in either the damping coefficient control means or said drive/control means.

2. An apparatus for controlling a damping coefficient for at least one vehicular shock absorber, the shock absorber being interposed between a vehicular shock absorber, the shock absorber being interposed between a vehicle body and a tire wheel, as set forth in claim 1, which further includes abnormality detection means, integrally incorporated into the actuator for detecting an abnormality in the actuator and for generating and outputting an abnormality occurrence signal to the fail safe control means and to the damping coefficient control means and wherein the damping coefficient control means carries out a predetermined fail safe operation upon receipt of the abnormality occurrence signal from the abnormality detection means.

3. An apparatus for controlling a damping coefficient for at least one vehicular shock absorber, the shock absorber being interposed between a vehicle body and a tire wheel, as set forth in claim 2, wherein the predetermined fail safe operation carried out by the fail safe control portion toward the actuator is such that an expansion stroke side of the shock absorber provides a relatively high damping coefficient and the predetermined fail safe operation carried out by the damping coefficient control means is such that the drive signal output to the actuator is halted.

4. An apparatus for controlling a damping coefficient for at least one vehicular shock absorber, the shock absorber being interposed between a vehicle body and a tire wheel, as set forth in claim 3, wherein said input signal generating means comprises a sprung mass longitudinal acceleration sensor installed on the vehicle body adjacent the shock absorber.

5. An apparatus for controlling a damping coefficient for at least one vehicular shock absorber, the shock absorber being interposed between a vehicle body and a tire wheel, as set forth in claim 4, wherein the input signal generating means includes a vehicle speed sensor constructed to detect a vehicle speed and a steering angle sensor to detect a steering angle of the vehicle body and wherein said apparatus has a plurality of shock absorbers, each shock absorber being interposed between the vehicle body and a corresponding tire wheel.

6. An apparatus for controlling a damping coefficient for at least one vehicular shock absorber, the shock absorber being interposed between a vehicle body and a tire wheel, as set forth in claim 5, wherein said actuator comprises a pulse motor connected to said damping coefficient changing means.

7. An apparatus for controlling a damping coefficient for at least one vehicular shock absorber, the shock absorber being interposed between a vehicle body and a tire wheel, as set forth in claim 4, wherein said damping coefficient changing means comprises a variable position adjuster installed in said shock absorber and the position of said adjuster is changed at three positions in response to its stepping rotation angle based on the drive signal of said pulse motor.

8. An apparatus for controlling a damping coefficient for at least one vehicular shock absorber the shook absorber being interposed between a vehicle body and a tire wheel, as set forth in claim 7, wherein said damping coefficient control means includes second abnormality detection means for detecting the abnormality in the damping coefficient control means and generating and outputting another abnormality occurrence signal to the fail safe control means and to a calculation means of the damping coefficient control means when detecting the abnormality in the damping coefficient control means.

9. An apparatus for controlling a damping coefficient for at least one vehicular shock absorber, the shock absorber being interposed between a vehicle body and a tire wheel, as set forth in claim 8, wherein said damping coefficient control circuit is constituted by a microcomputer as a main control unit and wherein said damping coefficient control circuit outputs a coefficient control signal dv to said drive/control circuit when operating normally.

10. An apparatus for controlling a damping coefficient for at least one vehicular shock absorber, the shock absorber being interposed between a vehicle body and a tire wheel, as set forth in claim 9, wherein said drive/control means is constituted by said fail safe control means, said abnormality detection means, and a drive means for the pulse motor, said drive means outputting a drive/control signal tv according to the damping coefficient control signal when said drive/control means as a sub control unit operates normally, and wherein said abnormality detection means monitors each bit pattern of the coefficient control signal dv and of the drive/control signal tv and outputs the abnormality occurrence signal to said fail safe control means when detecting one of the bit patterns of either the damping coefficient control signal or the drive/control signal tv does not correspond to the other bit pattern thereof.

11. An apparatus for controlling variable damping coefficients for vehicular shock absorbers, each shock absorber being interposed between a vehicle body and a tire wheel, comprising:
   a) actuators;
   b) damping coefficient changing means for operatively changing its position so as to provide optimum damping coefficients for the respective shock absorbers in response to a drive derived from said respective actuators;
c) input signal generating means for generating input signals related to vehicular behavior;
d) a damping coefficient control means which is so constructed as to derive optimum damping coefficients for the respective shock absorbers according to the vehicular behavior upon receipt of the input signals from the input signal generating means;
e) a drive/control means which is so constructed as to form drive/control signals to actuate the actuators to output the drive signals to the damping coefficient changing means, the drive/control means being integrally incorporated into the respective actuators and being separated from the damping coefficient means; and
f) a fail safe control means, installed in each of the actuators, which is so constructed as to provide a predetermined fail safe drive for each of the actuators upon receipt of a signal indicating an occurrence of abnormality in either the damping coefficient control means or the drive/control means.

* * * * *